United States Patent [19]

Yang et al.

[11] Patent Number: 5,052,108
[45] Date of Patent: Oct. 1, 1991

[54] HANDLELESS CUTTING AND PARING TOOL FOR FRUITS/VEGETABLES

[76] Inventors: Thomas Yang, 3FL.6-1 Lane 78, Song Chiang Rd.; Ching Deng, 4F.27 Lane 160 Hsin Sheng S.Rd., Sec 1,, both of Taipei, Taiwan

[21] Appl. No.: 502,624

[22] Filed: Apr. 2, 1990

[51] Int. Cl.$^5$ .................. A22B 5/16; B26B 11/00; B26B 1/00; A47J 23/00
[52] U.S. Cl. ................ 30/123.5; 30/123.7; 30/113.1; 30/136
[58] Field of Search ............... 30/123.7, 113.5, 113.1, 30/123.5, 136, 142, 358, 127, 128, 130, 136; 99/542, 545, 588, 592

[56] References Cited

U.S. PATENT DOCUMENTS

| | | | |
|---|---|---|---|
| 668,821 | 2/1901 | Long | 30/113.1 |
| 702,419 | 6/1902 | Giovanna | 30/113.5 |
| 869,529 | 10/1907 | Smith | 30/123.7 |
| 1,339,367 | 5/1920 | Risdon | 30/113.1 |
| 2,540,393 | 2/1951 | Hawley | 30/123.5 |
| 2,683,312 | 7/1954 | Dover | 30/113.1 |
| 4,890,549 | 1/1990 | Steiner et al. | 30/136 |

FOREIGN PATENT DOCUMENTS

| | | | |
|---|---|---|---|
| 2242707 | 3/1973 | Fed. Rep. of Germany | 30/123.5 |
| 867909 | 12/1941 | France | 30/123.5 |
| 7507749 | 5/1976 | Netherlands | 30/123.5 |
| 675670 | 7/1952 | United Kingdom | 30/123.5 |
| 694796 | 7/1953 | United Kingdom | 30/123.5 |

Primary Examiner—Douglas D. Watts
Assistant Examiner—Paul M. Heyrana, Sr.
Attorney, Agent, or Firm—Lalos & Keegan

[57] ABSTRACT

A handleless cutting and paring tool for fruits and vegetables comprising a handleless oblong plate-like body with a slightly concave cross section configuration, means for slitting and paring member provided at one end of the body, a sectorial portion for peeling and scooping provided at another end of the body, and a longitudinal central paring slot formed at the substantial central portion of the body and a side cutting blade means with an indented edge formed on the side of said body. With such arrangement, the cutting and paring means as disclosed has multiple functions and may be used to cut, slash, slit, scoop, pare and peel various fruits and vegetables with cutleries of different shapes and different angles without hurting the edible portion of pulp of the fruits or vegetables under preparation.

14 Claims, 7 Drawing Sheets

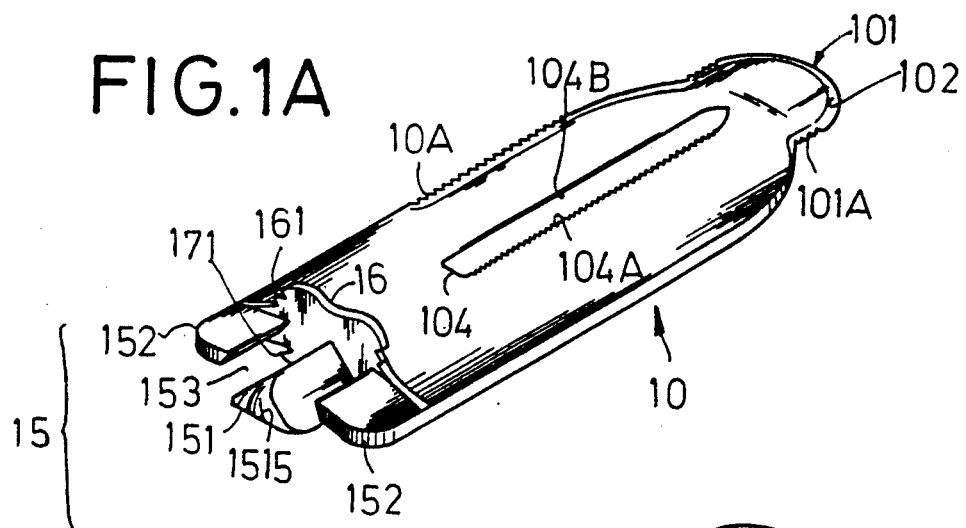
FIG.1A
FIG.1B
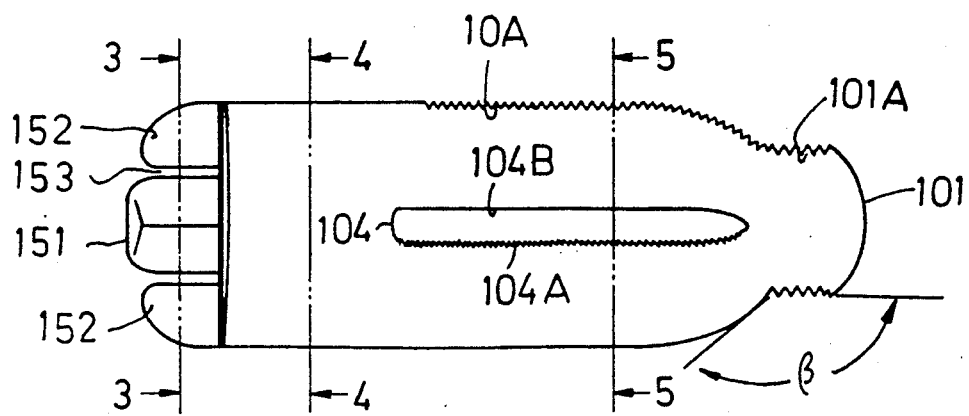
FIG. 2

(B-B)

HANDLELESS CUTTING AND PARING TOOL FOR FRUITS/VEGETABLES

BACKGROUND OF THE INVENTION

The present invention relates to a handleless cutting and paring device for fruits and vegetables having several cutters with different shapes formed at different locations for cutting or paring fruits and vegetables without damaging their edible portion while the operation thereof is simple and convenient.

Conventional cutleries or peelers for fruits or vegetables are ususally designed to be used for a single purpose and does not have the desired effect if they are used for any purpose other than that for which they are designed. For instance, a knife in the form of plate is designed to cut something, if it is used to peel fruits or vegetables, it is inevitable to encounter difficulties in operation and performance, such as hurt edible portion, incompletely pared skin, or uneven thickness of peeled skin. On the other hand, a peeler is designed to pare fruits or vegetables instead of being used to cut the same, remove cores or seeds in fruits or vegetables, or scoop out any surface indent on skin of gourds, or rhizomic vegetables. For those rhizomic vegetables having thicker or harder cuticular fibers, such as kohlrabi, turnip, etc., a normal peeler is almost useless.

Under the circumstances, users would have to purchase various kinds of cutters or peelers to meet different needs which obviously increases users' expenses in this aspect. Besides, almost all the conventional cutleries have a handle which not only prevents one end of the cutleries from doing other cutting works but also increases the length and volume of cutleries which in turn causes inconvenience in carrying them. Some of the cutleries have a very sharp blade and tip and must be covered with a sheath which also increases the volume of the cutleries.

For the purpose of explaining the drawbacks of existing fruit or vegetable cutters or peelers, a conventional peeler designed to peel fruit is now used as an example. Referring to FIG. 11A, the conventional peeler includes a peeling portion 3 and a handle 31, and is only suitable for vegetables and fruits having thinner cuticle, such as radish, cucumber, loofah, potato, apple, pear, musk melon, etc. Such peeler does not suitable for scoopling out the core of apple or pear and the inner seeds of musk melon or cucumber, it is neither suitable for paring fruits and vegetables having thicker outer skin, such as orange, grapefruit, kohlrabi, turnip, etc. Therefore, a user must select different cutting means according to different fruits and vegetables; sometimes, it is possible to use several different means to complete the cutting, peeling, scooping, etc. for the same fruit or vegetable and causes so much inconvenience to the user.

The peeling portion 3 of the peeler as shown in FIG. 11A has a generally arcuate cross section. However, to allow for easy forming, blades 32 having a nearly flat cross section as shown in FIG. 11B are normally formed. With such a blade, it is quite possible that some of the edible portion of the fruit or vegetable will be peeled off together with the outer skin. When peeling elongated gourds or rhizomic vegetables, the blade 32 is apt to slide deeper and deeper into the edible portion as shown in FIG. 12 and causes juice to flow out of injured fruits. One of the solutions is to narrow the gap between the blade 32 and the blunt edge 33. However, outer skin peeled off by the peeler might be stuck in this narrow gap and stop the peeling. The user must clear off the stuck peel before he or she can continue the peeling. This is one of the major drawbacks of conventional peelers.

For citrus fruits such as oranges, grape fruits, etc., delicious juice rich with vitamin C is protected by a layer of spongy film. Reticulate veins for carrying nutrient between the spongy film and fruit outer skin make the pulp and skin distinctly separate. Since the skin closely attaches to the surface of pulp, it is not easy to peel off the outer skin of the fruits by hand and fingers (except some types of oranges). Under the circumstances, most people will use a fruit knife to slice the fruit and take out the pulp by hand at the expense of much delicious and nutritious juice.

SUMMARY OF THE INVENTION

It is therefore the primary object of the present invention to provide a handleless cutting and paring device for fruits and vegetables wherein each area has a different function so that a user may use it to quickly complete all the cutting, peeling, scooping, etc. without the need to change many different cutleries.

Another object of the present invention is to provide a handless cutting and paring device for fruits and vegetables in which a slitting/paring member consisting of a middle triangular paring means, two peeling thickness control members, and two lip-shaped blades is formed at one end. With such an arrangement, the outer skin of citrus fruits may be gradually and adequately slit without harming the pulp contained therein while the skin may be continuously peeled off around the circumference of the fruit.

A further object of the present invention is to provide a handleless cutting and paring device for fruits and vegetable which has a longitudinal slot with an arcuate cross section formed at its center. One side of the slot is a sharp blade and the other side is a dull edge. The sharp blade is slightly lower than the dull edge so that it may be positioned more closely to a surface to be peeled than the dull edge, thereby facilitating the first cut formed on the fruit or vegetable surface. Since the arcuate profile of the sharp blade has a minimum contact area with an arcuate fruit/vegetable surface, an adequate and controlled cut depth may be obtained without hurting the pulp or edible portion. Meanwhile, a larger gap is allowed between the sharp blade and the dull edge lest the skin peeled off is stuck between there.

A still further object of the present invention is to provide a handleless cutting and paring device for fruits and vegetables, the circumference of which allows the user to hold it directly without hurting the hand holding it while the length of the tool is suitable for holding without the need to have another handle. In this way, both the length and the volume of the tool may be reduced while the end may used for other cutting or peeling purposes to increase the functions of the means.

The final object of the present invention is to provide a handleless cutting and paring device for fruits and vegetables which has a slicing portion with indented blade provided at one or two sides for partially cutting or slicing fruits or vegetable effortlessly.

BRIEF DESCRIPTION OF THE DRAWINGS

Aforementioned and other objects and advantages of the invention will become apparent form the following description of specific embodiments when read in connection with the accompanying drawings in which FIG. 1A is a perspective view of the first embodiment of the invention showing the top side thereof;

FIG. 1B is a perspective view of the first embodiment of the invention showing the bottom side thereof;

FIG. 2 is a plan view of FIG. 1A;

For the convenience of description, the same numbers are marked in all illustrated embodiment for each corresponding part for easy cross-reference.

DETAILED DESCRIPTION OF THE PREFERRED EMBODIMENTS

Figure 4:
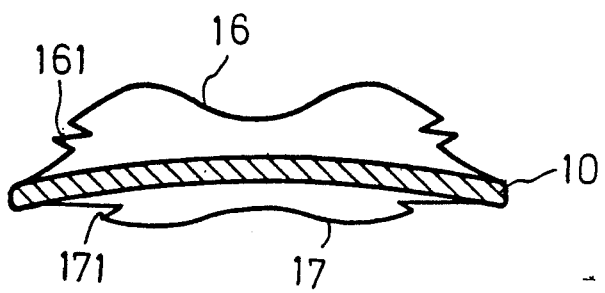
FIG. 4 is a cross-sectional view taken on the line 4—4 of FIG. 2.
Figure 5:
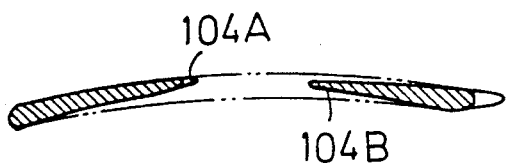
FIG. 5 is a cross-sectional view taken on the line 5—5 of FIG. 2.

Please refer to FIGS. 1A to 5. The present invention of a handleless cutting and paring device for fruits and vegetables includes a generally oblong and plate-like body 10 with a slightly arcuate cross section, one end of the body 10 is a slitting/paring member 15 which further consists of a middle triangular paring means 151, two side paring thickness control members 152, and two lip-shaped blades means 16, 17 extending upward and downward from the body 10, respectively. Each of the paring thickness control members 152 is disposed in such a manner that a downward and outward slant gap 153 is formed between each member 152 and each side of the triangular paring means 151. On two sides of the lip-shaped blades means 16 and 17, tooth-like tips 161 and 171 are formed, respectively. The triangular paring means 151 has a slightly concave bottom 1515 to match the arcuate body 10 while its two bottom portion form two sharp blades 1513. Due to the slant gap 153, fruit skin being peeled off may pass there freely permitting continual paring.

Figure 3:
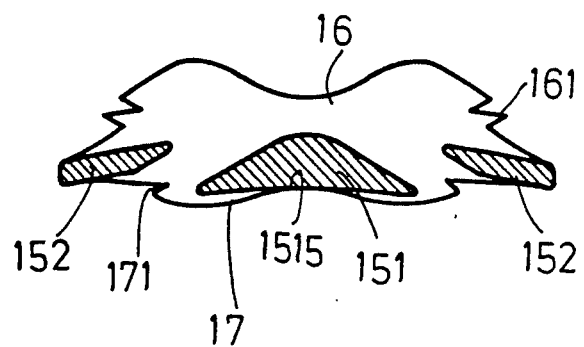
FIG. 3 is a cross-sectional view taken on the line 3—3 of FIG. 2.
Figure 8A:
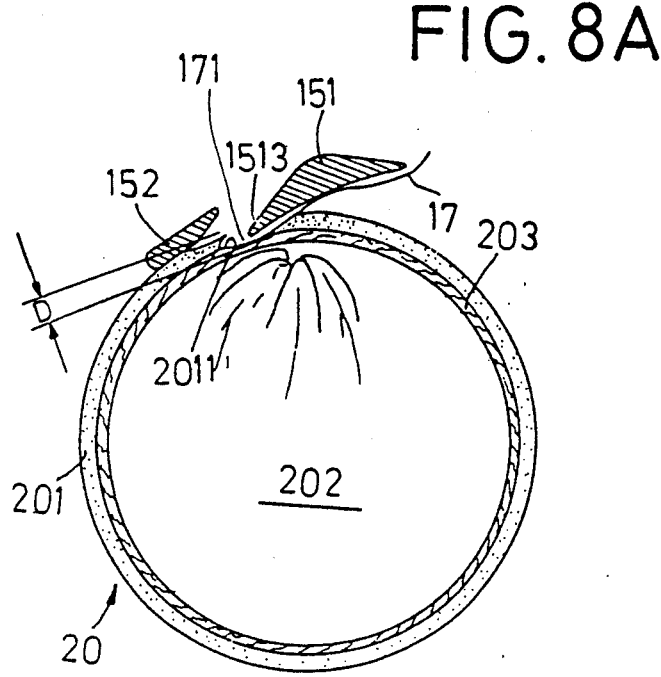
FIGS. 8A to 8C illustrate the steps of paring a fruit by using the slitting and paring portion disclosed in the invention.
Figure 8B:
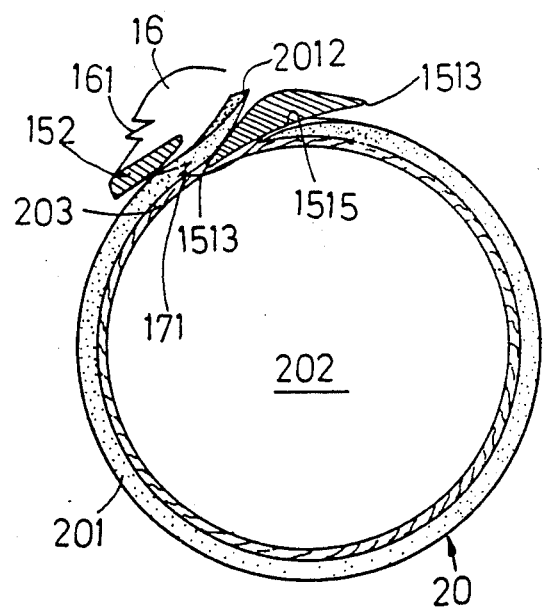

Please refer to FIGS. 3 and 4. The lip-shaped blades means 16 and 17 are vertically provided at rear end of the slitting/paring member 15 and have tooth-like tips 161 and 171 of different depths formed on two sides at different heights to match the shape of the triangular cutter means 151 to cut into fruit skin of different thicknesses. Such slitting/paring portion 15 is most suitable for paring fruits having thicker skin, such as oranges and grape fruits. In operation, press one of the tooth-like tips 161 (or 171) into fruit skin for proper depth while press one lip edge of the lip-shaped blades means against fruit surface so as to control the cutting depth formed by the toothlike tip as shown in FIG. 8A. Then, push the triangular paring means 151 so that one of the blades 1513 will slide forward along the cut formed on fruit skin by the tooth-like tip 161 (or 171) as shown in FIG. 8B. At this time, the concave bottom 1515 of the triangular paring means 151 will closely attach to pulp surface beneath there to facilitate the front skin to separate from fruit plup by the force from the blade 1513. Separated fruit skin will then backwardly pass the gap 153 freely to allow the blade 1513 to continually slide forward along the circumference of fruit without hurting the pulp and wasting delicious juice therein.

Figure 9A:
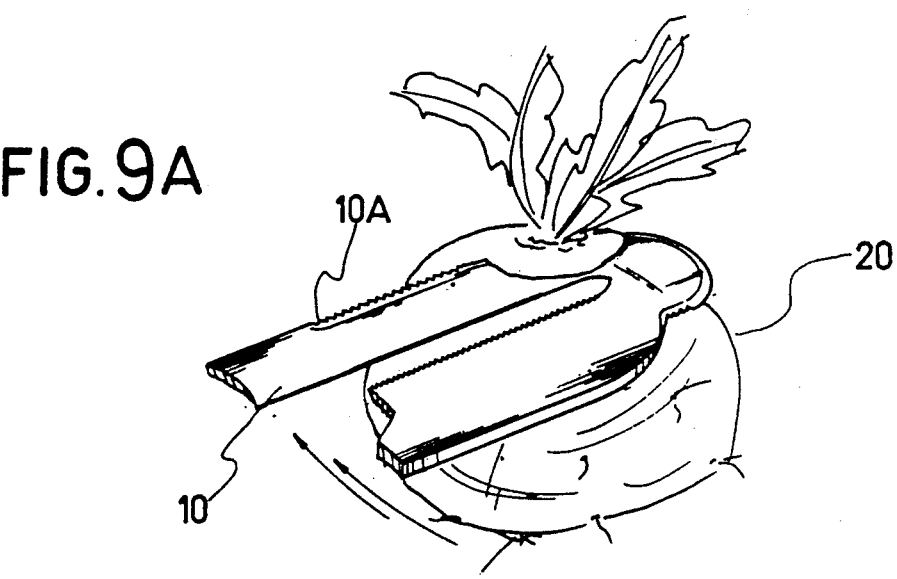
FIGS. 9A to 9C illustrate the steps of cutting, slitting, and paring a kohlrabi by using the side indented blade and the sectional blade disclosed in the invention.
Figure 9B:
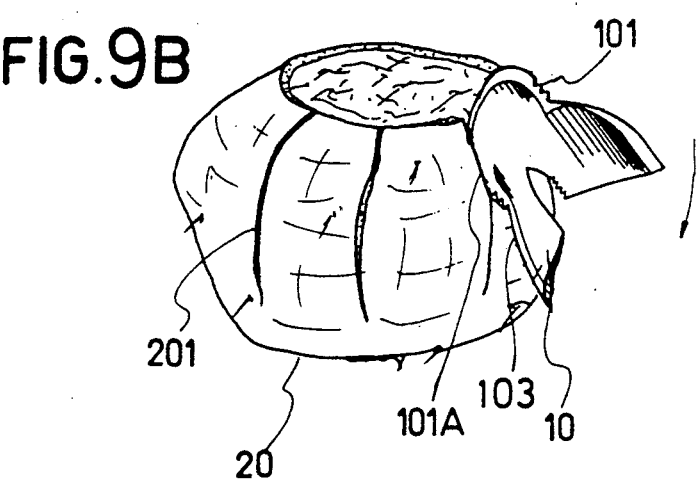
Figure 9C:
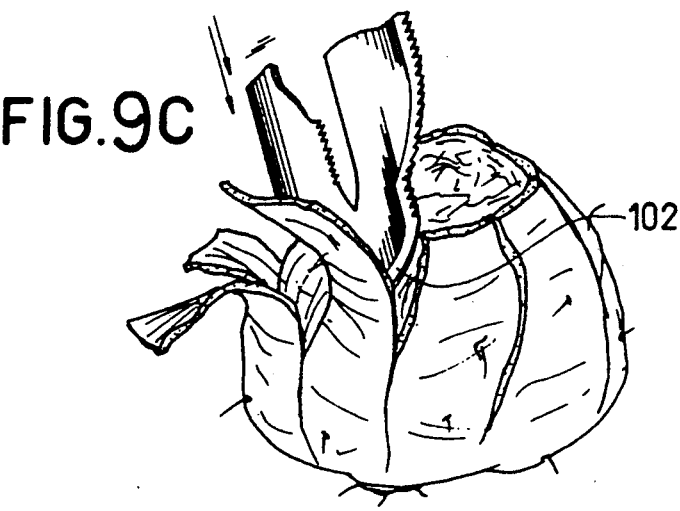
Figure 11A:
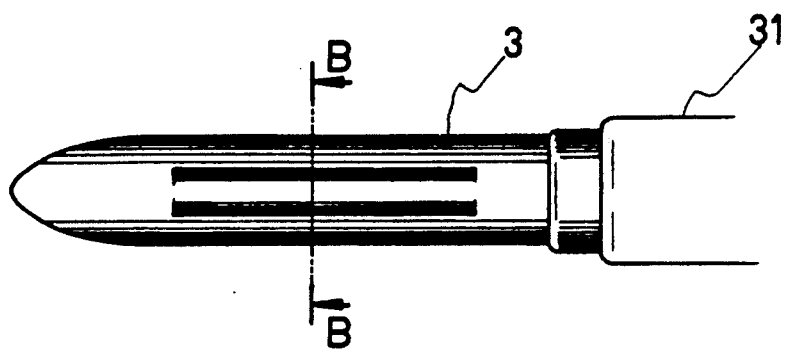
FIG. 11A shows a conventional fruit peeler.
Figure 11B:
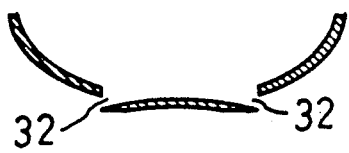
FIG. 11B is a cross-sectional view taken on line B—B of FIG. 11A.
Figure 12:
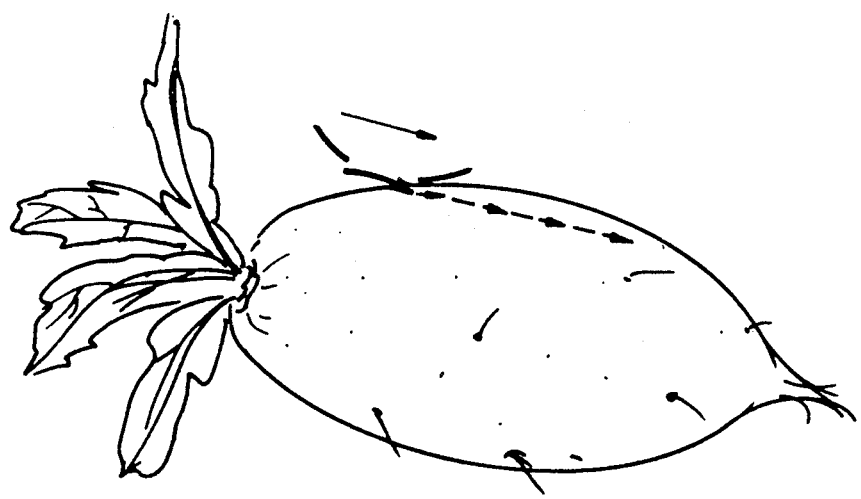
FIG. 12 illustrates the peeling of a radish by using a conventional fruit peeler as shown in FIGS. 11A and 11B.

Another end of the body 10 is an axially extended sectorial portion 101 with a slightly concave cross section. A sectorial blade means 102 is formed at the outer edge of the sectorial portion 101. The sectorial blade means 102 has a profile which allows it to closely attach to fruit or vegetable surface and to be pushed forward easily. An outwardly opened angle β is formed at each side of the body 10 between the body 10 and the sectional portion 101. Indented edges 101A are formed at two sides of the base of the sectorial portion 101. In operation, let one of the indented edges 101A contact fruit or vegetable surface to be cut with the angle β as a support point to control proper cut depth formed by the sectorial blade means 102. The indented edge 101A may be used to easily slit a harder skin of fruits or vegetables as shown in FIGS. 9A to 9C. This sectorial portion 101 is most suitable for removing the outer skin of grape fruits, turnips, kohlrabis, etc., scopping out apple cores, pear cores, inner seeds of muck melons, cucumbers, etc., and clearing indented areas on the surface of sponge gourds, potatos, radishes, etc. When using the sectorial portion 101 to remove the hard skin of kohlrabis, turnips, etc., first use an indented blade 10A to cut off useless leaf and head as shown in FIG. 9A. Then, use the indented edge 101A to form some generally parallel grooves on the fruit or vegetable surface as shown in FIG. 9B. At this point, use the sectorial portion 101 to separate the skin along the circumference of the fruit or vegetable as shown in FIG. 9C, and the skin may be easily peeled off. Since the arcuate surface of the sectorial portion 101 may closely attach to the arcuate surface of fruit or vegetable, the edible portion will not be hurt by the blade means 102. When using the sectorial portion 101 to scoop off fruit cores or inner seeds, the sectorial blade means 103 may be directly used to achieve the purpose.

Please refer to FIGS. 1A, 1B, 2, 5, 7 and 10. The body 10 of the present invention may be formed with an axially elongated slot 104 at its center and the cross section of the slot 104 is slightly concave. An indented blade 104A and a dull edge 104B are separately formed at two inner sides of the slot 104 while the indented blade 104A is closer to the surface of fruit or vegetable to be peeled when comparing with the dull edge 104B (See FIG. 5). With this arrangement, it will be more easy for the blade 104A to cut in fruit or vegetable surface. Moreover, since the blade 104A is concave in its cross section, it has minimum contact area with the fruit or vegetable to be peeled. As a result, the cut depth formed by the blade 104A may be controlled by the pressing force from the dull edge 104B applying to the fruit or vegetable surface in the front of the indented blade 104A. Therefore, the blade 104A will not excessively cut into the fruit or vegetable skin and hurt the pulp or edible portion. Meanwhile, the elongated slot 104 may have a properly widened width (5 mm or so) to avoid any pared skin from jamming in it.

The advantages of using such a parer with wider slot and indented blade includes easy operation, energy-saving (it is more easy for an indented blade to cut into fruit skin), and harmless structure (it is not necessary to require a very sharp indented blade to complete the paring operation, so the possibility of injury to fingers is minimized). This enlongated slot 104 for paring is particularly suitable for fruits and vegetables having thinner skin, such as apples, pears, musk melons, cucumbers, sponge gourds, radishes, potatos, etc. This is a unique point of the invention. With respect to the peeling movement by this invention, please refer to FIG. 10.

The indented blade 10A may be formed on at least one side of the body 10 to facilitate the cutting or peeling.

Figure 8C:
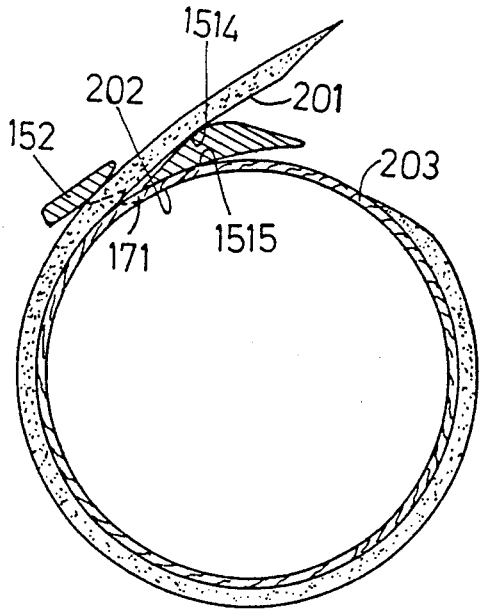

From FIGS. 8A to 8C, it can be seen that when the invention is used to paring a fruit 20, the body 10 is placed against the fruit surface to form a proper and inclined angle between them first, so that the toothlike tip 171 of the lip-shaped blade means 17 can slantwise cut into fruit skin 201 and makes a cutting path 2011 as shown in FIG. 8A. At this point, the bottom face of the paring thickness control member 152 will closely press against the surface of fruit skin 201. When the body 10 is further pushed forward, the toothlike tip 171 will forwardly slit the fruit skin tissue and forms a groove on the skin surface as a preset cutting path boundary. The side blade 1513 of the middle triangular paring means 151 will immediately follow the tooth-like tip 171 and gradually slides down into the fruit skin 201 as shown in FIG. 8B. A thin tip of the slit skin 2012 will then pass and extend outward through the slant gap 153 between the paring thickness control member 152 and the middle triangular paring means 151. When the blade 1513 keeps moving forward, the fruit skin 201 will be continually pared off along the circumference of the fruit 20, and the peeled skin 201 is confined in the slant face 1514 of the triangular paring means 151 and the bottom face of the paring thickness control member 152 as shown in FIG. 8C while it keeps moving backward and out of the body 10.

Since the toothlike tip 171 is closely and fixed attached to the rear end of the triangular paring means 151 while the bottom 1515 of the triangular paring means 151 keeps closely pressing against the pulp surface 202, and the peeled fruit skin 201 keeps entering into the slant gap 153, a cut depth formed by the toothlike tip 171 is limited to the thickness of fruit skin being peeled off. As shown in FIG. 8A, the distance D the toothlike tip 171 projected from the bottom face of the paring thickness control member 152 is a little less than the skin thickness of general citrus fruits, such as oranges, grape fruits, etc. Therefore, when the present invention is used to continually peel a fruit, the toothlike tip 171 can only slit the harder outer skin of the fruit without hurting a sponge layer 203 between the skin 201 and the pulp 202 and causing delicious juice to leak out. The user's hands can maintain clean when using the invention to peel a fruit.

Now further explain the correct steps for paring the skin of a turnip (or a kohlrabi) by using a first embodiment or a third embodiment (described in later paragraph) of the invention. As shown in FIG. 9A, put the indented blade 10A against head of the turnip 20 (or kohlrabi) to be peeled, then use one side of the indented edges 101A of the sectorial portion 101 to slit several generally parallel grooves 201 from the head of the turnip 20 (or kohlrabi) toward the bottom of the same as shown in FIG. 9B. Then, use the relatively thinner arcuate edge means 102 of the sectorial portion 101 to scoop off the outer skin of the turnip 20 by inserting the edge means 102 into the inner side of the outer skin and pulling the outer skin outward and downward as shown in FIG. 9C. By this way, the outer skin of a trunip or kohlrabi may be quickly and easily removed. The invention may also be used to peel a grape fruit by the same steps (not shown). When using the sectorial portion 101 to slit grooves 201 on the vegetable skin, a shoulder 103 (see FIG. 7) formed at a smooth side opposite to the indented blade 10A may be put against the arcuate surface of the turnip (or kohlrabi) to be peeled so as to form a support and control point to control the depth formed by the indented edge 101A, so that grooves with proper depth may be formed by the sectorial portion 101 for easy peeling.

Figure 6A:
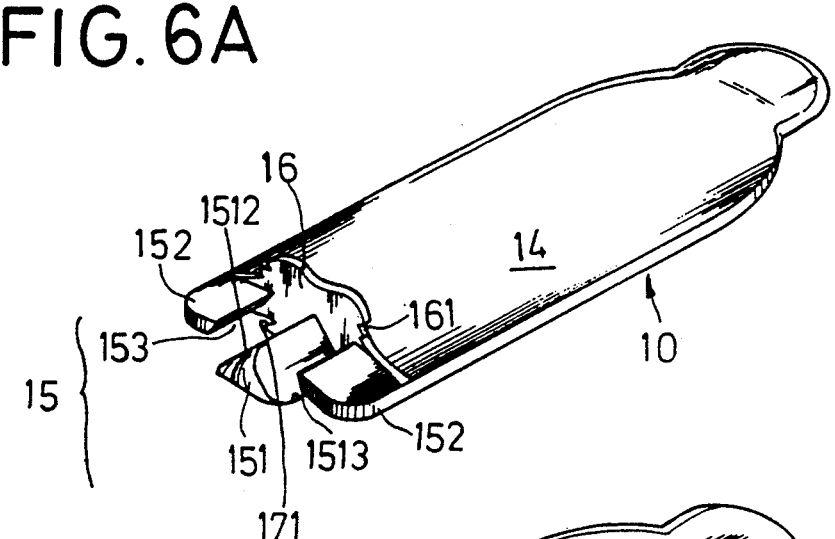
FIG. 6A is a perspective view of the second embodiment of the invention showing the top side thereof.
Figure 6B:
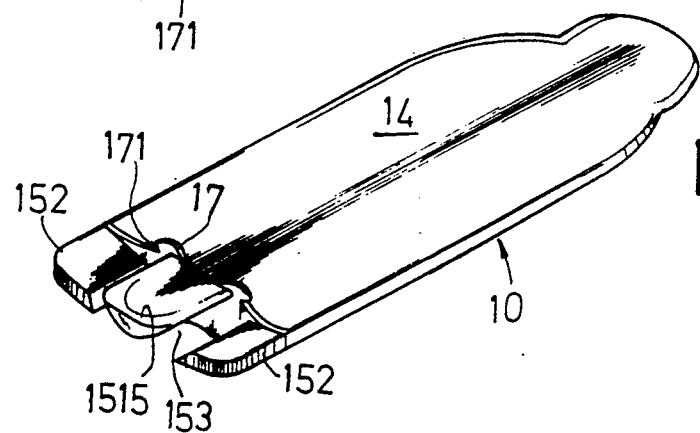
FIG. 6B is a perspective view of the second embodiment of the invention showing the bottom side thereof.
Figure 6C:
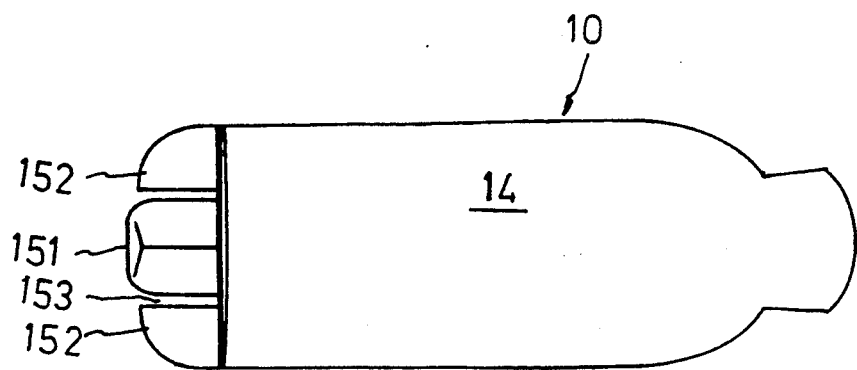
FIG. 6C is a plan view of FIG. 6A.
Figure 10:
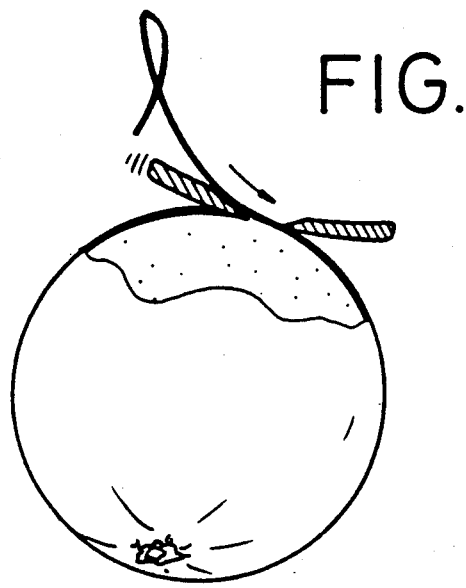
FIG. 10 illustrate the peeling of a fruit by using the central peeling slot disclosed in the invention.

Please refer to FIGS. 6A to 6C illustrating the second embodiment of the present invention. The second embodiment is generally similar to the first embodiment as illustrated in FIGS. 1A and 1B, however, it only has a slitting/paring member 15 and a sectorial portion 101 while the central elongated peeling slot 104, the side indented blade 10A, and the indented edge 101A of the sectorial portion 101 originally existed on the first embodiment are omitted. Therefore, the second embodiment is only suitable for paring citrus fruits and scooping off apple cores, pear cores, inner seeds of musk melons, cucumbers, etc.

Figure 7:
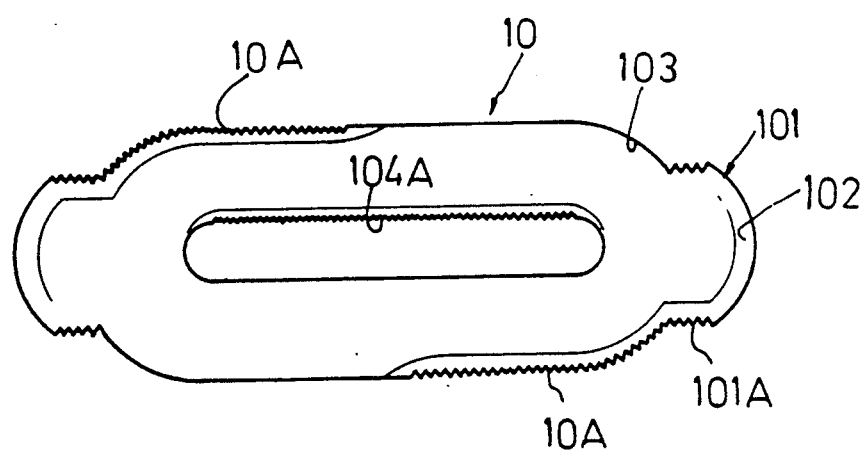
FIG. 7 is a plan view of the third embodiment of the invention.

Please further refer to FIG. 7 illustrating the third embodiment of the invention. The third embodiment is also similar to the first embodiment as illustrated in FIGS. 1A and 1B, however, its body 10 is only provided with a central elongated peeling slot 104 with one side of indented blade 104A, two side indented blades 10A, and two sectroial portions 101 with indented edge 101A and sectorial blade means 102 formed on two ends of the body 10. The slitting/ paring member 15 originally existed in the first embodiment is omitted from the third embodiment. With this arrangement, the third embodiment is suitable for cutting and peeling fruits or vegetables having thinner skin. Therefore, it may be used as a complement of the second embodiment.

There are still other embodiments derived from previous embodiments, such as a body 10 similar to that disclosed in previous embodiments but having not side indented blade or blades 10A, or having not indented edge 101A on the sectorial portion 101. It is to be understood that these embodiments of the invention may have various changes in shapes, sized, and arrangement in parts without departing from the spirit of the invention or the scope of the subjoined claims, even though they are not shown in the drawings attached hereto.

We claim:

1. A handleless cutting and paring device for fruits/-vegetables comprising:
   a generally oblong and plate-like body with a slightly concave cross-sectional configuration;
   a slitting/paring member formed on one end of said body;
   a sectorial portion formed on the other end of said body;

a longitudinal central paring slot formed at the center portion of said body; and at least a side cutting blade means formed on one side portion of said body;

said slitting/paring member comprising a middle triangular paring means, a pair of paring thickness control members disposed at both sides of said middle triangular paring means, and at least one lip-shaped blade means extending vertically upward and downward from said body, said middle triangular paring means and said paring thickness control members being disposed in such a manner that a downwardly and outwardly slanted gap is formed between each side of said middle triangular paring means and each of said paring thickness control members to allow peeled fruit or vegetable skin to pass therethrough.

2. A handleless cutting and paring tool for fruits/vegetables as claimed in claim 1, wherein:

toothlike tips are further provided on two sides of said lip-shaped blades means to aid peeling by slitting fruit or vegetable skin.

3. A handleless cutting and paring tool for fruits/vegetables as claimed in claim 1, wherein said sectorial portion has a relatively thinner sectorial blade means at its outer edge.

4. A handleless cutting and paring tool for fruits/vegetables as claimed in claim 3, wherein at least one side of said sectorial portion is provided with indented edge.

5. A handleless cutting and paring tool for fruits/vegetables as claimed in claim 3, wherein said sectorial portion has a slightly concave cross section.

6. A handleless cutting and paring tool for fruits/vegetables as claimed in claim 1, wherein said longitudinal peeling slot has a concave cross section and has a blade and a dull edge separately formed on one longitudinal inner side of said peeling slot; said blade has a lower position than that of said dull edge so that said blade is closer to fruit or vegetable surface to be peeled.

7. A handleless cutting and paring tool for fruits/vegetables as claimed in claim 6, wherein said paring blade of said central elongated peeling slot is of indented edge.

8. A handleless cutting and paring tool for fruits/vegetables as claimed in claim 1, wherein said side cutting blade is of indented edge.

9. A handleless cutting and paring tool for fruits/vegetables as claimed in claim 1, wherein said middle triangular paring means has two blades formed at two bottom portions of said middle triangular paring means and has a slightly upward arcuate bottom.

10. A handleless cutting and paring tool for fruits/vegetables comprising:

a plate-like body with a slightly concave cross section configuration;

a slitting/paring member formed at one end of said plate-like body; and a set of lip-shaped blades vertically extending from said body provided nearby said slitting/paring member;

said slitting/paring member comprising a middle triangular paring means and two side paring thickness control members having a generally arcuate plate-like configuration, and said lip-shaped blades means having toothlike tips formed on at least one side of said lip-shaped blades means;

said middle triangular paring means having a triangular cross section, two blades means formed at its two bottom portions, and a slightly upward arcuate bottom;

said middle triangular paring means and said two side paring thickness control members being disposed in such a manner that a downwardly and outwardly slanted gap is formed betweeen each side of said middle triangular paring means and each of said paring thickness control members to allow peeled fruit or vegetable skin to pass therethrough.

11. A handleless cutting and paring tool for fruits/vegetables as claimed in claim 10, wherein said set of lip-shaped blade means includes two lip-shaped blades means with different sizes and separately extending upwardly and downwardly from and perpendicular to said slitting and paring portion for cutting fruit and vegetable skin of different thickness.

12. A handleless cutting and paring tool for fruits/vegetables as claimed in claim 11, wherein said lip-shaped blades means have toothlike tips formed on each side thereof.

13. A handleless cutting and paring device for fruits and vegetables comprising:

a generally oblong and plate-like body with a slightly concave cross-sectional configuration having two end portions and two side portions;

a sectorial portion formed on one of said end portions of said body having a slightly concave cross-sectio, a smooth curvature sectional front portion and two side indented edges extending downward from two sides of said sectional front portion;

a longitudinal central paring slot formed at a center portin of said body having a slightly concave cross-section and having a paring blade and a dull edge separately formed on two longitudinal sides of said central paring slot, said paring blade having a slightly lower position than that of said dull edge so that said paring blade is closer to said fruit or vegetable surface to be pared wherein the difference in height between said blade and said dull edge will determine the thickness of fruit or vegetable surface to be pared;

at least one side cutting blade means with an indented edge formed on one side portion of said body;

a slitting/paring member formed on the other end portion of said body, said slitting/paring member comprising at least one lip-shaped blade means disposed at the other of said end portions of said body extending vertically upward and downward from said body, a middle triangular paring means with a substantially triangular cross-section extending forward from said lip-shaped blade means, and a pair of paring thickness control members disposed at both sides of said middle triangular paring means;

said middle triangular paring means and said paring thickness control members being disposed in such a manner that a downwardly and outwardly slanted gap is formed between each side of said middle triangular paring means and each of said paring thickness control members to allow peeled fruit or vegetable skin to pass therethrough; and tooth-like tips being further provided on two sides of said lip-shaped blade means to aid paring by slitting fruit or vegetable skin at a first beginning cut so that said middle triangular paring means will subsequently pare a substantial and continuously wide band of fruit or vegetable skin from fruit or vegetable surface along the slitting route of said tooth-like tip when said slitting/paring member is to be used.

14. A handleless cutting and paring device for fruits and vegetables, comprising:
   a generally oblong and plate-like body with a slightly concave cross-section configuration having two end portions and two side portions;
   a longitudinal central paring slot having a sawtooth-like blade formed on one of its inner sides and a dull edge formed on the other inner side opposite of said blade;
   said blade having a position slightly lower than that of said dull edge so that said blade may easily cut into said fruit or vegetable skin and controls skin thickness being pared;
   at least one sectorial portion extending outwardly from one end portion of said body, said sectorial portion having a relatively thinner sectorial front edge to form a sectorial blade means and two side indented edges extending downwardly from two sides of said sectorial front edge, an outwardly opened angle larger than 90 degrees being formed between one indented side edge of said sectorial portion and one side of said body;
   said body having at least one indented blade means formed on one of its side portions for cutting off skin of fruits or vegetables.

* * * * *